(12) United States Patent
Kishore (10) Patent No.: US 11,447,343 B2
(45) Date of Patent: Sep. 20, 2022

(54) TEMPERATURE MONITOR FOR A CONVEYOR BELT

(71) Applicant: Honeywell International Inc., Charlotte, NC (US)

(72) Inventor: Kuna Venkat Satya Rama Kishore, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/089,794

(22) Filed: Nov. 5, 2020

(65) Prior Publication Data

US 2021/0188565 A1 Jun. 24, 2021

(30) Foreign Application Priority Data

Nov. 21, 2019 (IN) .............................. 201911047501

(51) Int. Cl.
*B65G 43/02* (2006.01)

(52) U.S. Cl.
CPC ...... *B65G 43/02* (2013.01); *B65G 2203/0266* (2013.01)

(58) Field of Classification Search
CPC .................. B65G 43/02; B65G 2203/0266
USPC .................................... 198/810.01, 810.02
See application file for complete search history.

(56) References Cited

U.S. PATENT DOCUMENTS

| 4,114,559 A * | 9/1978 | Rogen ...................... G01K 3/00 |
| | | 116/216 |
| 7,347,317 B2 * | 3/2008 | Aizawa .................. B65G 43/02 |
| | | 198/690.1 |
| 8,397,904 B2 * | 3/2013 | Bogle ..................... A23L 3/003 |
| | | 198/810.04 |

(Continued)

FOREIGN PATENT DOCUMENTS

| CN | 112461405 A * | 3/2021 | ............. G01B 21/32 |
| DE | 102013102622 B4 * | 1/2021 | ............. G01K 11/06 |

(Continued)

OTHER PUBLICATIONS

Extended European Search Report issued in European Application No. 20207053.8 dated May 4, 2021, 9 pages.

(Continued)

*Primary Examiner* — Gene O Crawford
*Assistant Examiner* — Lester Rushin, III
(74) *Attorney, Agent, or Firm* — Alston & Bird LLP (57) ABSTRACT

A temperature monitor is provided for use on a conveyor belt. The temperature monitor includes a first wall and a second wall. The first wall and the second wall are generally parallel to one another. The temperature monitor also includes a first anchor and a second anchor. The first wall is attached to the first anchor at a first end and the first wall is attached to the second anchor at a second end. The second wall is attached to the first anchor at a first end and the second wall is attached to the second anchor at a second end. The temperature monitor further includes a temperature deformation mechanism defined between the first wall and (Continued)

the second wall. The temperature deformation mechanism is altered in an instance in which a predetermined temperature is reached. A method of manufacturing a temperature monitor and a temperature monitor system are also provided.

20 Claims, 6 Drawing Sheets

(56) References Cited

U.S. PATENT DOCUMENTS

| | | | |
|---|---|---|---|
| 10,191,001 B2* | 1/2019 | Kleczewski | G01N 27/228 |
| 2006/0219528 A1* | 10/2006 | Aizawa | G01K 7/36 |
| | | | 198/810.03 |

FOREIGN PATENT DOCUMENTS

| | | | | |
|---|---|---|---|---|
| GB | 2075650 A | * | 11/1981 | B65D 79/02 |
| GB | 2075650 A | | 11/1981 | |
| JP | 2009191898 A | * | 8/2009 | |
| JP | 2019-505771 A | | 2/2019 | |

OTHER PUBLICATIONS

First Examination Report issued in Indian Application No. 201911047501 dated Jun. 17, 2021, 6 pages.

* cited by examiner

TEMPERATURE MONITOR FOR A CONVEYOR BELT

TECHNOLOGICAL FIELD

Example embodiments of the present disclosure relate generally to monitoring temperature, and more particularly, to monitoring temperature of conveyors during operation.

BACKGROUND

During operations, conveyor belts experience drastic surface temperature changes that affect performance and reliability. For example, high temperatures along the conveyor belt can result in damage to the belt that requires repair. As such, monitoring the temperature of the conveyor belt can, in some examples, be valuable in ensuring effective operations and to reduce operational downtime. Applicant has identified several technical challenges associated with monitoring conveyor belt temperature. Through applied effort, ingenuity, and innovation, many of these identified challenges have been overcome by developing solutions that are included in embodiments of the present disclosure, many examples of which are described in detail herein.

BRIEF SUMMARY

The illustrative embodiments of the present disclosure relate to temperature monitor and method of manufacturing the same for monitoring temperature along a conveyor belt. In an example embodiment, a temperature monitor is provided for use on a conveyor belt. The temperature monitor includes a first wall and a second wall. The first wall and the second wall are generally parallel to one another. The temperature monitor also includes a first anchor and a second anchor. The first wall is attached to the first anchor at a first end of the first wall and the first wall is attached to the second anchor at a second end of the first wall. The second wall is attached to the first anchor at a first end of the second wall and the second wall is attached to the second anchor at a second end of the second wall. The temperature monitor further includes a temperature deformation mechanism defined between the first wall and the second wall. The temperature deformation mechanism is altered in an instance in which a predetermined temperature is reached.

In some embodiments, the temperature monitor is configured to be placed on the exterior of the conveyor belt or within a top cover of the conveyor belt. In some embodiments, the first wall, the second wall, the first anchor, and the second anchor are a unitary housing.

In some embodiments, the temperature deformation mechanism includes a temperature deflection strip configured to deflect towards the first wall or second wall in an instance the predetermined temperature of the conveyor belt is reached. In some embodiments, the temperature deflection strip is attached to the first wall at a first end of the temperature deflection strip and the temperature deflection strip is attached to the second wall at a second end of the temperature deflection strip. In some embodiments, the first wall of the temperature monitor is configured to be located perpendicular to the movement of the conveyor belt during operation.

In some embodiments, the temperature deformation mechanism includes a plunger mechanism and a temperature deformation material. In such embodiments, the temperature deformation material is configured to restrict the movement of the plunger mechanism until a predetermined temperature of the conveyor belt is reached. In some embodiments, the plunger mechanism includes a plunger attached at spring end of the plunger to a spring. In such an embodiment, the spring is attached to the plunger at a plunger end of the spring and attached to the second anchor at a wall end of the spring. In some embodiments, the temperature deformation material is configured to fill an area between the plunger and the first anchor in an instance the predetermined temperature has not been reached. In some embodiments, the temperature deformation material is configured to be a solid at below the predetermined temperature and a non-solid at or above the predetermined temperature. In such an embodiment, the temperature monitor is permanently deformed in an instance in which the predetermined temperature is reached.

In another example embodiment, a method of manufacturing a temperature monitor is provided for use on a conveyor belt. The method includes providing a first wall and a second wall. The first wall and the second wall are generally parallel to one another. The method also includes attaching the first wall to a first anchor at a first end of the first wall and a second end of the first wall to a second anchor. The method further includes attaching the second wall to the first anchor at a first end of the second wall and a second end of the second wall to the second anchor. The method still further includes providing a temperature deformation mechanism between the first wall and the second wall. The temperature deformation mechanism is altered in an instance in which a predetermined temperature is reached.

In some embodiments, the temperature monitor is configured to be placed on the exterior of the conveyor belt or within a top cover of the conveyor belt. In some embodiments, the temperature deformation mechanism includes a temperature deflection strip configured to deflect towards the first wall or second wall in an instance a predetermined temperature of the conveyor belt is reached. In some embodiments, providing a temperature deformation mechanism includes attaching the temperature deflection strip to the first wall at a first end of the temperature deflection strip and attaching the temperature deflection strip to the second wall at a second end of the temperature deflection strip. In some embodiments, the first wall of the temperature monitor is configured to be located perpendicular to the movement of the conveyor belt during operation.

In some embodiments, the temperature deformation mechanism includes a plunger mechanism and a temperature deformation material. In such an embodiment, the temperature deformation material is configured to restrict the movement of the plunger mechanism until a predetermined temperature of the conveyor belt is reached. In some embodiments, the plunger mechanism includes a plunger attached at spring end of the plunger to a spring. In such an embodiment, the spring is attached to the plunger at a plunger end of the spring and attached to the second anchor at a wall end of the spring. In some embodiments, the temperature deformation material is configured to fill an area between the plunger and the first anchor in an instance in which the predetermined temperature has not been reached. In some embodiments, the temperature deformation material is configured to be a solid at below the predetermined temperature and a non-solid at or above the predetermined temperature. In such an embodiment, the temperature monitor is permanently deformed in an instance in which the predetermined temperature is reached.

In still another example embodiment, a temperature monitor system is provided for use on a conveyor belt. The temperature monitor system includes a temperature monitor of various embodiments positioned on a conveyor belt. The temperature monitor system also includes a magnetic proximity sensor mounted on a frame of a roller belt conveyor near the conveyor belt, such that at least a portion of the temperature monitor is within a sensing area of the magnetic proximity sensor. The magnetic proximity sensor may be positioned such that three individual signals are detected each rotation from the first wall, the second wall, and the temperature deformation mechanism in an instance a predetermined temperature is not reached. The magnetic proximity sensor may be positioned such that only two individual signals each rotation detected in an instance the predetermined temperature is reached.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various example embodiments described herein such that embodiments may include fewer or more components than those shown in the figures while not departing from the scope of the disclosure.

Turning now to the drawings, the detailed description set forth below in connection with the appended drawings is intended as a description of various example configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

While various embodiments herein are discussed in reference to conveyor belts, the temperature monitor system may be used to monitor the occurrence of excess temperature events in various other applications, such as instances in which placing temperature probes may be difficult or not possible, and/or instances in which the area being monitored is not easily accessible for other type of temperature measuring instruments. For example, various embodiments may be used within rotating drums in industrial mixtures, clutch discs, or closed hot chambers/ovens. Various embodiments may be used as a safety device.

During operation, conveyor belts, especially those used for material transport in industrial processing, experience drastic temperature changes. For example, the surface temperature of a conveyor belt may increase when exposed to hot materials. In the cement industry, debris, such as a clinker, may fall directly onto the conveyor belt during operation and hot materials may come into contact with the conveyor belt during various usages, such as metal processing. Knowing and limiting the high temperature of conveyor belts are important to avoid break down or unscheduled maintenance of the conveyor belts. Additionally, some conveyor belts, such as conveyor belts that have carry side made out of rubber, may, in some examples, be more vulnerable to heat-induced defects, such as local pitting or holes, which may degrade the belt and/or decrease the mechanical strength of the conveyor belt. Frequent exposure of conveyor belts to excess temperatures may lead to premature failures that creates problems for users due to production loss and also for belt manufacturers due to increased warranty claims. Various embodiment discussed herein allow for temperature monitoring of conveyor belt temperature during operation. Example embodiments of the present disclosure allow for monitoring the temperature of the conveyor belt to determine if a predetermined temperature has been reached. In such cases, maintenance and/or preventive action may be taken so as to prevent a failure and/or other catastrophic loss.

Figure 1:
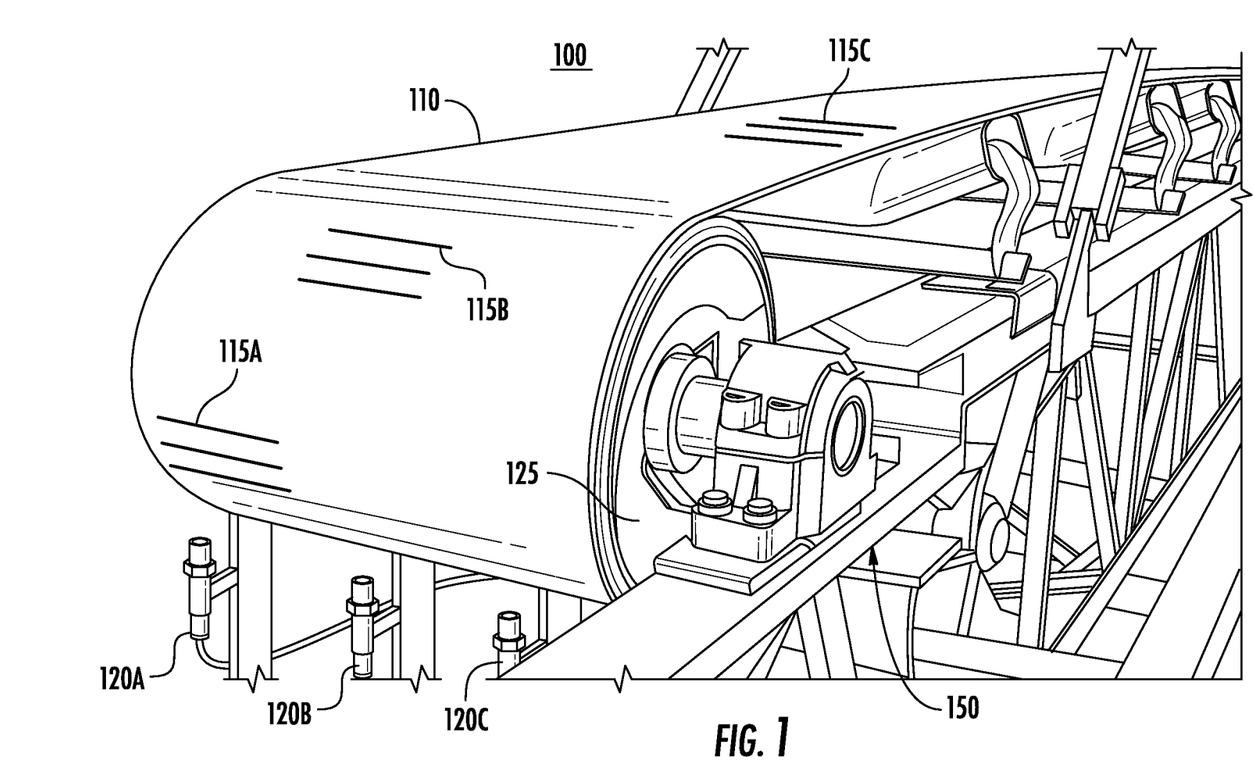
FIG. 1 illustrates a conveyor belt roller configured with a plurality of temperature monitors along the conveyor belt in accordance with example embodiments of the present disclosure.

FIG. 1 illustrates a perspective view of a roller belt conveyor 100, in accordance with one or more embodiments of the present disclosure. As shown in FIG. 1, the roller belt conveyor 100 may include a conveyor belt 110. The conveyor belt 110 may include a plurality of layers configured to move one or more items. For example, as shown in FIGS. 7A-8B, the conveyor belt may include a top cover 700 and a bottom layer 710 layered such that the top cover 700 may be exposed on the exterior of the conveyor belt 110. The conveyor belt 110 may be configured to rotate around a plurality of drums (e.g. conveyor drum 125) held in place via a frame 150 and configured to be actuate via a motor. Upon actuation of the motor, the conveyor belt 110 may be configured to revolve around the plurality of drums in either a first direction or a second, opposite direction. The conveyor belt 110 may include one or more temperature monitors 115A-C positioned in various positions along the conveyor belt.

Figure 7A:
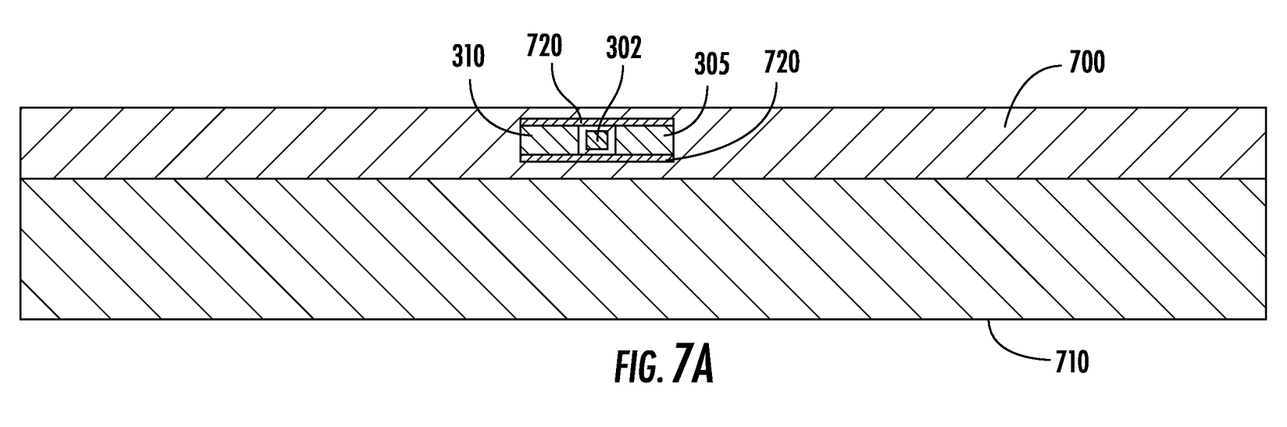
FIG. 7A illustrates a temperature monitor of an example embodiment, such as the one shown in FIGS. 3A-3B, embedded in the top cover of the conveyor belt.
Figure 7B:
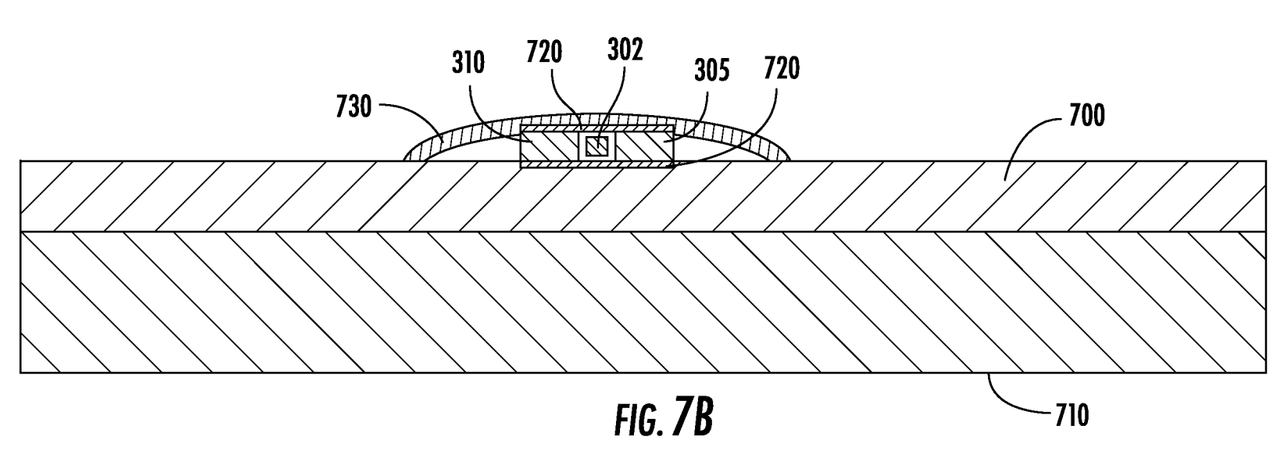
FIG. 7B illustrates a temperature monitor of an example embodiment, such as the one shown in FIGS. 3A-3B, glued on the exterior of the conveyor belt.
Figure 8A:
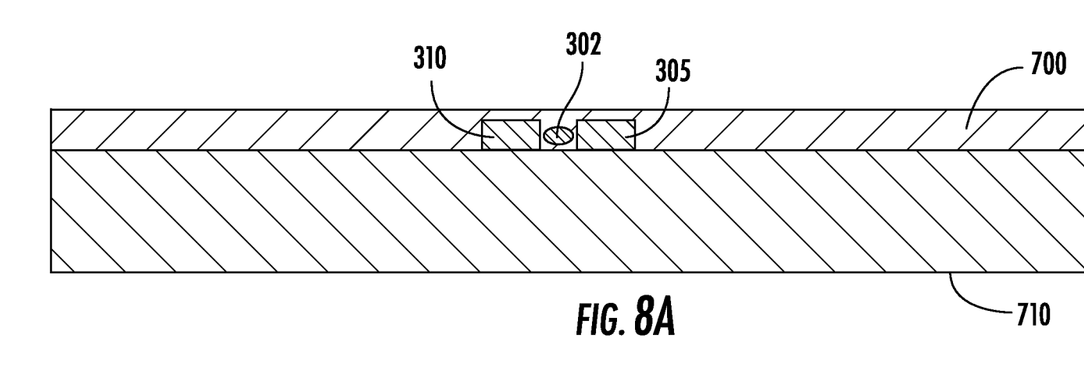
FIG. 8A illustrates a temperature monitor of an example embodiment, such as the one shown in FIGS. 5A-5B, embedded in the top cover of the conveyor belt.
Figure 8B:
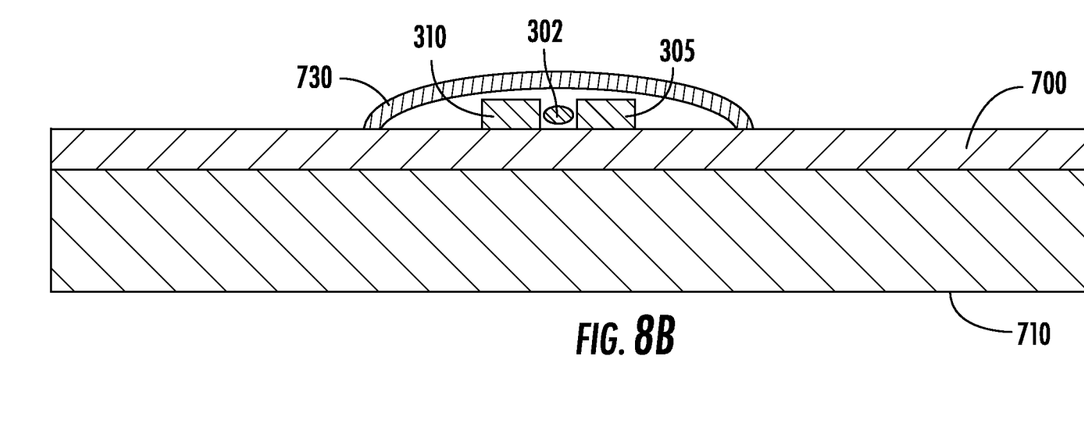
FIG. 8B illustrates a temperature monitor of an example embodiment, such as the one shown in FIGS. 5A-5B, glued on the exterior of the conveyor belt.

As shown in FIG. 1, the temperature monitors 115A-C may be mounted on the conveyor belt 110 such that different areas along the conveyor belt 110 may be monitored. The temperature monitor(s) 115A-C may be attached to the conveyor belt 110, such that temperature monitor(s) may further travel with the conveyor belt 110 in a direction of conveyance of the conveyor belt 110. As shown in FIGS. 7B and 8B, in some embodiments, the temperature monitor 115 may be positioned on the exterior of the conveyor belt 110 (e.g., the part of the conveyor belt configured to convey materials). In some embodiments, in an instance in which the temperature monitor 115 is positioned on the exterior of the conveyor belt 110, a top patch 730 or glue may be used to hold the temperature monitor in place during operation. In some embodiments, the temperature monitor 115 may be embedded within the conveyor belt 110. As shown in FIGS. 7A and 8A, the temperature monitor 115 may be positioned under the top cover 700 of the conveyor belt 110, such that the proximity sensor 120 may still recognize signals from the temperature monitor 115. In various embodiments, the top cover 700 of the conveyor belt 110 may be made out of rubber. In some embodiments, the temperature monitor 115 may be affixed to the conveyor belt 110 via adhesives, binding agents, glue, and/or the like. In some embodiments, the temperature monitor 115A-C may be positioned along the width of the conveyor belt 110 (e.g., along the conveyor drum 125 length). In various embodiments, a temperature monitor 115A-C may be positioned such that the length direction of the temperature monitor 115A-C may be approximately perpendicular to the movement of the belt (e.g., parallel with the length direction of the conveyor drum 125). As shown in FIGS. 7A-8B, in various embodiments in an instance in which the temperature monitor 115 is installed on a conveyor belt 110, the first wall 305, the temperature deformation mechanism 302, and the second wall 310 may each be in contact with the conveyor belt 110, whether on the exterior of the conveyor belt or embedded within the conveyor belt.

In various embodiments, one or more magnetic proximity sensor 120 may be provided near the conveyor belt 110. In some embodiments, proximity sensor 120 may be positioned such that the temperature monitors 115A-C may cause a plurality of signals to be received each revolution of the conveyor belt 110. In some embodiments, as shown, a plurality of magnetic proximity sensors 120 may be provided to monitor a plurality of temperature monitors 115A-C. In some embodiments, one magnetic proximity sensor may monitor a plurality of temperature monitors 115A-C during operations. For example, two temperature monitors 115 may be positioned in the same plane along the width of the conveyor (e.g., along the drum 125), but at different places along the length of the conveyor belt 110, such that as the conveyor belt 110 revolves, the same magnetic proximity sensor may pick up signals from each of the temperature monitors 115 at different times during a revolution of the conveyor belt 110.

In various embodiments, the proximity sensor 120 may monitor the temperature sensors using magnetic field, such that a signal is created in an instance a magnetic material passes near the sensor. In some embodiments, the proximity sensor 120 may be a magnetic proximity sensor. In some embodiments, the proximity sensor 120 may be a magnetic reluctance type sensor (e.g., using eddy currents) or a magnetoresistive type sensor (e.g., using the anisotropic magneto resistive (AMR) effect or tunnel magnetoresistance (TMR) effect). In some embodiments, the magnetic proximity sensor 120 may be placed near the conveyor belt 110. For example, the proximity sensor 120 may be positioned approximately perpendicularly to the conveyor belt 110, such that the sensing area of the proximity sensor 120 may be focused on a point along the conveyor belt. In various embodiments, the magnetic proximity sensor 120 may be positioned such the sensor 120 does not interfere with the operation of the conveyor belt 110 (e.g., transferring objects). For example, the proximity sensor 120 may be positioned near the conveyor belt 110 at a location that the conveyor belt does not typically carry any items, such as under the conveyor drum 125. In some embodiments, the magnetic proximity sensor(s) 120 may be affixed to the roller belt conveyor 100 with suitable mechanical fixtures, such that a consistent sensing may be maintained during operation. In various embodiments, the magnetic proximity sensor 120 may be positioned such that one or more temperature monitors 115 of example embodiments may pass by the magnetic proximity sensor 120 during the operation of the conveyor belt 110. For example, the magnetic proximity sensor 120 may be positioned such that when the conveyor belt 110 rotates, a temperature monitor 115 may pass by the magnetic proximity sensor 120 registering a signal for each of the first wall 305, the second wall 310, and the temperature deformation mechanism as described herein. In various embodiments, the temperature monitor 115 may be positioned on the conveyor belt such that each of the first wall 305, the second wall 310, and the temperature deformation mechanism may be separate along the length direction of the conveyor belt, such that the magnetic proximity sensor 120 may receive a pulse from the first wall 305, the second wall 310, and the temperature deformation mechanism consecutively as the conveyor belt rotates.

As discussed herein, in an instance the predetermined temperature is not reached, the signal includes three consecutive, individual pulses from the first wall 305, temperature deformation mechanism, and second wall 310. Alternatively, in an instance the predetermined temperature is reached, the signal includes only two individual pulse as the signal from the temperature deformation mechanism either combines with one of the first wall 305 or the second wall 310 (as discussed in reference to FIGS. 3A-3B), or moves out of the sensing area of the proximity sensor 120 (as discussed in reference to FIGS. 5A-5B). In some embodiments, the temperature monitor 115 may be in communication with a temperature indicator (e.g., a light) such that the indicator notifies a user in an instance in which the predetermined temperature has been reached.

Figure 2:
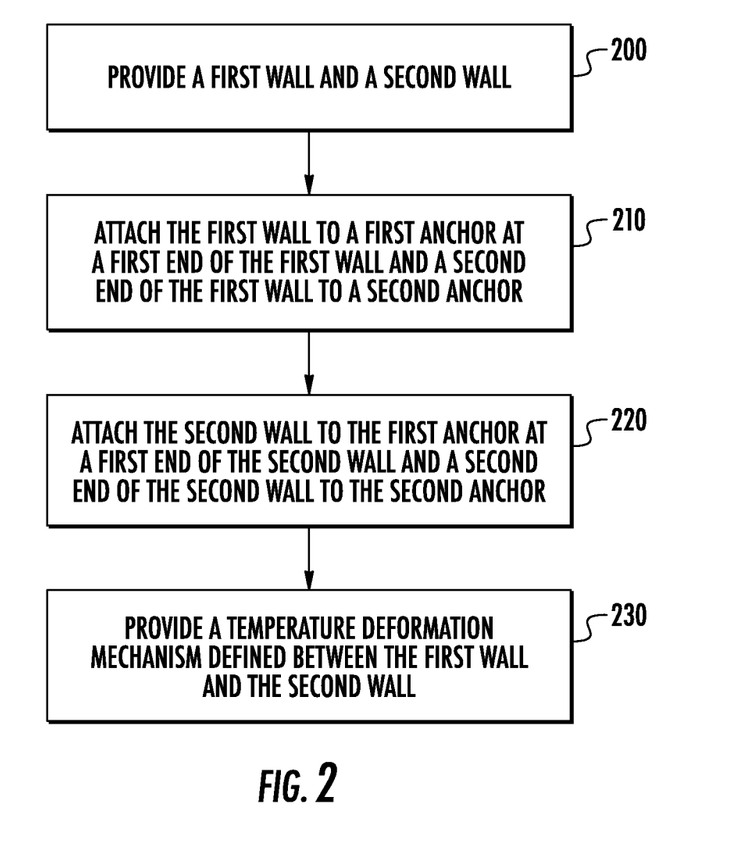
FIG. 2 illustrates an example method of manufacture of a temperature monitor in accordance with the present disclosure.

FIG. 2 illustrates a method of manufacturing a temperature monitor in accordance with an example embodiment of the present disclosure. In various embodiments, the temperature monitor may act as a sensor, such as a passive sensor. Various embodiments of the method described may be carried out in a different order than described herein, unless explicitly stated otherwise.

Figure 3A:
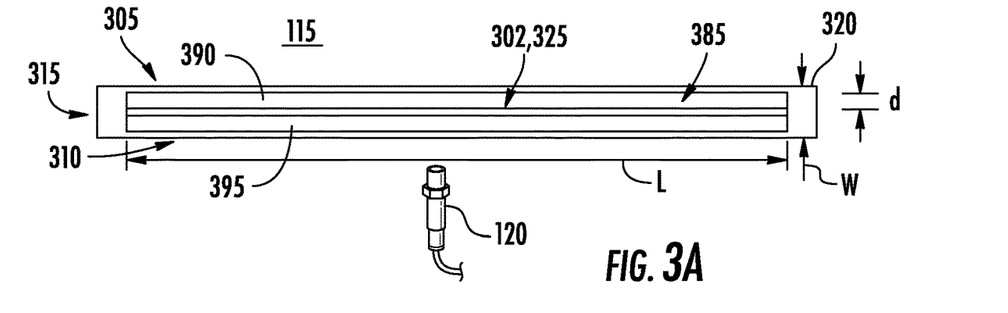
FIG. 3A illustrates a temperature monitor, such as the one discussed in FIG. 2, in an instance the temperature of the conveyor belt is below a predetermined temperature in accordance with example embodiments of the present disclosure.
Figure 3B:
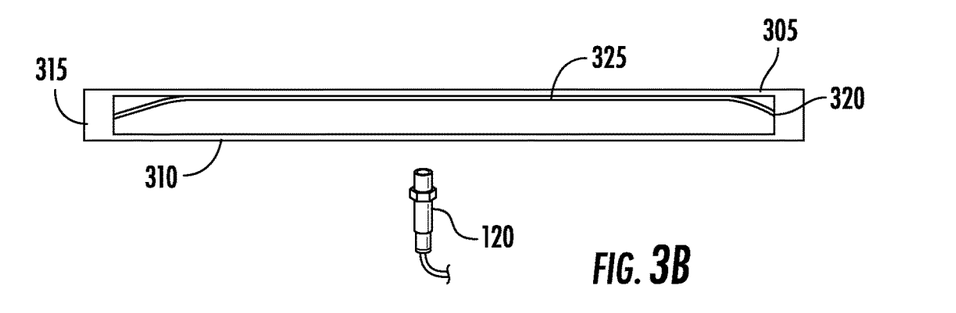
FIG. 3B illustrates a temperature monitor, such as the one discussed in FIG. 2, in an instance the temperature of the conveyor belt is above a predetermined temperature in accordance with example embodiments of the present disclosure.

Referring now to Block 200 of FIG. 2, the method of manufacture may include providing a first wall and a second wall. As shown in FIGS. 3A and 3B, the first wall 305 and the second wall 310 may be generally parallel to one another. In some embodiments, the first wall 305 and the second wall 310 may be made out of a magnetic permeable material (e.g., a material that allows the proximity sensor to detect magnets through). In some embodiments, a magnetic proximity sensor 120 may receive a signal from each of the first wall 305 and the second wall 310. For example, the first wall 305 and the second wall 310 may be made out of a magnetic permeable metal, such as soft or mild iron. In some embodiments, the first wall 305 and the second wall 310 may be thermally conductive. In various embodiments, the first wall 305 and the second 310 may be relatively thin strips of magnetic permeable material. For example, the length (L) of each wall 305, 310 may be substantially more than the width of each wall. For example, the width of each wall may be approximately 1 millimeter to 3 millimeters and the length of each wall may be approximately 40 millimeters to 70 millimeters. Various other lengths and widths may be used based on the use case of the temperature monitor 115. In some embodiments, the width of the temperature monitor 115 may be based on the radius of the conveyor drum 125, such that temperature monitor 115 experiences minimal mechanical stress during operation.

Referring now to Block 210 of FIG. 2, the method of manufacture may include attaching the first wall to a first anchor at a first end of the first wall and a second end of the first wall to a second anchor. In some embodiments, the first anchor 315 and the second anchor 320 may be generally parallel to one another. In some embodiments, the first anchor 315 and the second anchor 320 may be generally perpendicular to the first wall 305. In some embodiments, the first wall 305 and at least one of the first anchor 315 or the second anchor 320 may be cut from a metal sheet (e.g., using a stamping tool). In some embodiments, the first wall 305 and anchors 315, 320 may be attached using metal joining techniques, such as welding, fasteners, glues, or the like.

Referring now to Block 220 of FIG. 2, the method of manufacture may include attaching the second wall to the first anchor at a first end of the second wall and a second end of the second wall to the second anchor. In some embodiments, the first anchor 315 and the second anchor 320 may be generally perpendicular to the second wall 310. In some embodiments, the first wall 305 and the second wall 310 may be attached to each anchor such that a deformation cavity 385 may be defined between the first wall 305 and the second wall 310. In various embodiments, the first wall 305, second wall 310, first anchor 315, and second anchor 320 may form the exterior of the temperature monitor 115.

In some embodiments, the temperature monitor 115 takes the form of a strip shaped capsule, such that the exterior housing of the temperature monitor 115 may have a length (e.g., formed via the length (L) of a wall along with the width of both anchors as shown in FIG. 3A) that is substantially longer than the width (e.g., W shown in FIG. 3A may be a few millimeters) of the housing. In some embodiments, the width (W) of the housing may be based on a desired curvature of the temperature deformation mechanism (e.g., the temperature deflection strip 325). In some embodiments, at least one of the walls 305, 310 and the anchors 315, 320 may form a unitary housing (e.g., the first wall 305 and the anchor 315 may be made out of the same piece of material). In some embodiments, the first wall 305, the second wall 310, the first anchor 315, and the second anchor 320 may be cut from a metal sheet (e.g., using a stamping tool). In some embodiments, the walls and anchors may be attached using metal joining techniques, such as welding, fasteners, glues, or the like. In some embodiments, the anchors 315, 320 may support the walls 305, 310, such that the size of the cavity 385 remains generally consistent during use.

Referring now to Block 230 of FIG. 2, the method of manufacture may include providing a temperature deformation mechanism. In various embodiments, the temperature deformation mechanism may be configured to be altered based on an instance in which a predetermined temperature is reached. As discussed in reference to FIGS. 3A-3B and 5A-5B, the temperature deformation may use different components to effectively monitor the temperature of a conveyor belt 110 when installed. In some embodiments, the first wall 305 and the second wall 310 may define a deformation cavity 385, wherein the temperature deformation mechanism 302 may be defined. In an example embodiment, the temperature deformation mechanism 302 may be positioned approximately in the middle of the deformation cavity 385. In some embodiments, a first thermal pathway 390 may be defined between the first wall 305 and the temperature deformation mechanism 302. Additionally, a second thermal pathway 395 may be defined between the second wall 310 and the temperature deformation mechanism. In various embodiments, the first thermal pathway 390 may be configured to allow heat (e.g., heat from the conveyor belt 110) to reach the temperature deformation mechanism 302 via the first wall 305. In various embodiments, the second thermal pathway 395 may be configured to allow heat (e.g., heat from the conveyor belt 110) to reach the temperature deformation mechanism 302 via the second wall 310.

Example Operation

Referring now to FIG. 3A, the temperature monitor 115 is shown in accordance with an example embodiment in an instance the temperature is below the predetermined temperature. As shown, in some embodiments, the temperature deformation mechanism 302 may include a temperature deflection strip 325 configured between the first wall 305 and the second wall 310. In some embodiments, the temperature deflection strip 325 may be made out of a bimetallic material. In various embodiments, the temperature deflection strip 325 may be attached at the first anchor 315 at a first end and attached to the second anchor 320 at a second end. In some embodiments, the temperature deflection strip 325 may be positioned a distance away from each of the first wall 305 and the second wall 310, such that the temperature deflection strip 325 has sufficient space to deform towards either the first wall 305 or the second wall 310. In some embodiments, as shown in FIGS. 7A-7B, the temperature monitor 115 may have one or more protective cover 720 configured to protect the temperature deflection strip 325 during operation.

In some embodiments, the temperature deflection strip 325 may be positioned approximately in the middle of the deformation cavity 385, such that the distance from the temperature deflection strip 325 to the first wall 305 (e.g., distance d) may be approximately the same as the distance from the temperature deflection strip 325 to the second wall 310.

In various embodiments, the temperature deflection strip 325 may be configured to deform based on the temperature of the belt surface. In some embodiments, the distance (e.g., distance d in FIG. 3A) between the first wall 305 and the temperature deflection strip 325, and also the distance between the second wall 310 and the temperature deflection strip 325, may be based on the target predetermined temperature. For example, as the temperature increases, the temperature deflection strip 325 may continually deflect towards either the first wall 305 or the second wall 310 until a temperature at which the temperature deflection strip 325 is at maximum deflection (e.g., the middle of the temperature deflection strip is in contact with the first wall 305 or the second wall 310).

In various embodiments, the direction of deflection of the temperature deflection strip 325 may be based on the direction of rotation of the conveyor belt 110. For example, in one direction, the heat from the conveyor belt 110 may be transferred through the first wall 305 such that the temperature deflection strip 325 deflects towards the second wall 310 and in the other direction, the heat from the conveyor belt 110 may be transferred through the second wall 310 such that the temperature deflection strip 325 deflects towards the first wall 305. In an example embodiment where the temperature monitor 115 of FIG. 3A is installed on a conveyor roller, the temperature monitor 115 may be positioned such that in an instance in which the conveyor belt 110 rotates in a first direction (e.g., in an instance in which the belt 110 were moving in the downward direction in an instance the first wall 305 is positioned above the second wall 310), the heat from the conveyor belt 110 may enter the first wall 305 of the temperature, travel through the first thermal pathway 390 to the temperature deflection strip 325, and cause the temperature deflection strip 325 to deflect towards the second wall 310. Additionally, the temperature monitor 115 may be positioned such that in an instance in which the conveyor belt 110 rotates in a second direction (e.g., in an instance in which the belt 110 were moving in the upward direction in an instance the first wall 305 is positioned above the second wall 310), the heat from the conveyor belt 110 may enter the second wall 310 of the temperature, travel through the second thermal pathway 395 to the temperature deflection strip 325, and cause the temperature deflection strip 325 to deflect towards the first wall 305. FIGS. 7A-7B illustrate two example installation positions of a temperature monitor 115 in accordance with the embodiments discussed in FIGS. 3A-3B.

In various embodiments, the temperature deflection strip 325 may be configured to completely deflect in either direction at a given predetermined temperature. In some embodiments, the predetermined temperature may be approximately 120 degrees Celsius to 150 degrees Celsius. In some embodiments, the predetermined temperature may be approximately 150 degrees Celsius to 180 degrees Celsius. In some embodiments, the predetermined temperature may be approximately 180 degrees Celsius to 220 degrees Celsius. In some embodiments, the predetermined temperature may be approximately 220 degrees Celsius to 250 degrees Celsius. In various embodiments, the predetermined temperature may be upwards of 1000 degrees Celsius. In some embodiments, the predetermined temperature may be based on the type of conveyor belt used. For example, the predetermined temperature may correspond to the recommended operating temperature for a given conveyor belt. The temperature monitor 115 may be configured to completely deflect at different predetermined temperatures based on the design of the temperature deformation mechanism 302, such that the temperature deflection strip 325 having various widths, thicknesses, lengths, cavity sizes, and/or materials.

Figure 4A:
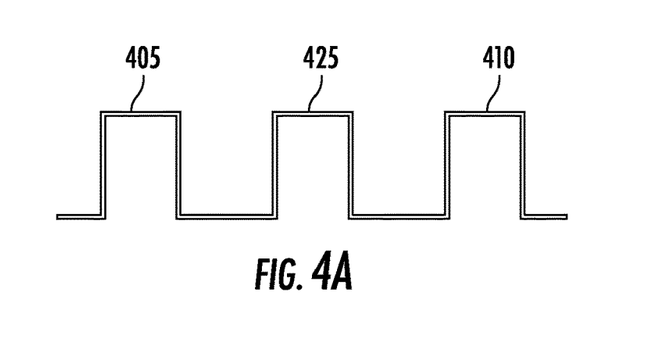
FIG. 4A illustrates example signals recognized by a proximity sensor in an instance the proximity sensor shown in FIG. 3A passes by the proximity sensor in accordance with example embodiments of the present disclosure.

FIG. 4A illustrates an example reading of a proximity sensor 120 in an instance the temperature deflection strip 325 has not deflected (e.g., FIG. 3A), the magnetic proximity sensor 120 may register three individual signals (405, 410, and 425). In such an example, each signal relates to one of the first wall 305 (e.g., signal 405), the second wall 310 (e.g., signal 410), or the temperature deflection strip 325 (e.g., signal 425).

Figure 4B:
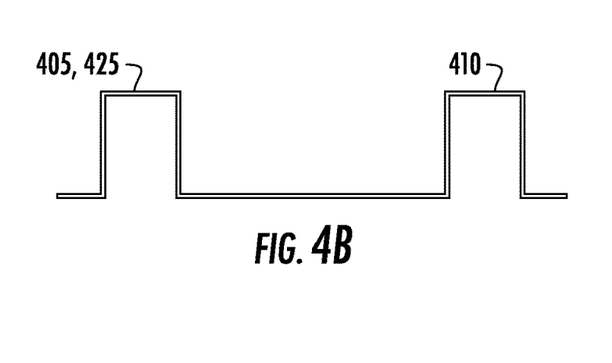
FIG. 4B illustrates example signals recognized by a proximity sensor in an instance the proximity sensor shown in FIG. 3B passes by the proximity sensor in accordance with example embodiments of the present disclosure.

In some examples and as the temperature increases, the signal 425 relating to the temperature deflection strip 325 may begin to move towards one of the magnetic signals relating to the first wall 305 or the second wall 310. For example, FIG. 3B illustrates an example embodiment in which the temperature deflection strip 325 has been completely deformed towards the first wall 305 and, thus, signal 425 overlaps with signal 405, such that the signal 425 and signal 405 may be indistinguishable. In the example shown in FIGS. 3A-3B, as the heat of the conveyor belt 110 increases, the temperature deflection strip 325 deflects towards the first wall 305 (e.g., since the heat is transferred through the second wall 310). As shown in FIG. 4B, in an instance the temperature deflection strip 325 completely deflects such that the temperature deflection strip 325 contacts the first wall 305 (e.g., FIG. 3B), the signal relating to the first wall 305 and the temperature deflection strip 325 overlap, such that only two individual signals are recognized instead of the three individual signals shown in FIG. 4A. In an example embodiment where the conveyor belt 110 rotates in the opposite direction, the heat from the conveyor belt 110 may be transferred to the temperature deflection strip 325 through the first wall 305, such that the temperature deflection strip 325 deflects towards the second wall 310. In such an embodiment, in an instance the predetermined temperature is reached, the signal 425 of the temperature deflection strip 325 would then overlap with the signal 410 of the second wall 310, such that only two individual signals are recognized.

In various embodiments, the pulses recognized by the magnetic proximity sensor 120 from the temperature monitor 115 may be stored, such as in an event log. Additionally, in various embodiments, the pulse width and separation may be a function of conveyor belt velocity, deformation distance (d) and thickness of each of the first wall 305, second wall 310, and temperature deflection strip 325. As such, the temperature deflection strip 325 may designed for a given predetermined temperature and extent of deformation needed to register distinctive output pulse (e.g., based on the type of magnetic proximity sensor 120). In some embodiments, the temperature monitor 115 shown in FIGS. 3A-3B may be reusable, such that the deflection of the temperature deflection strip 325 may not be permanent.

Figure 5A:
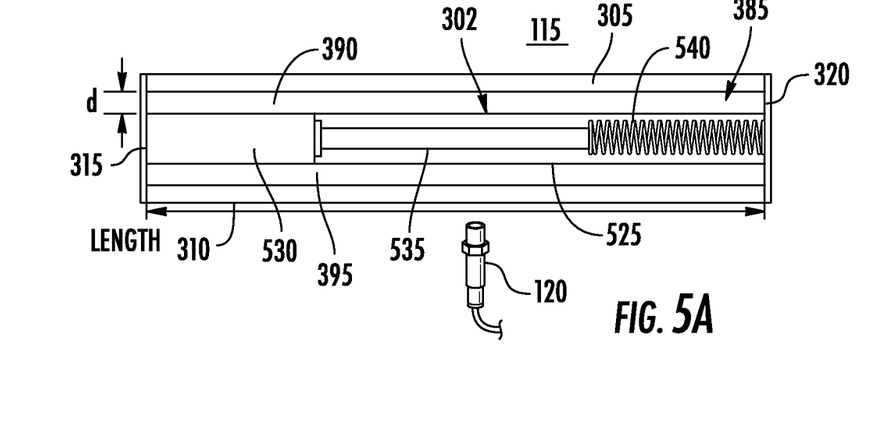
FIG. 5A illustrates a temperature monitor, such as the one discussed in FIG. 5, in an instance the temperature of the conveyor belt is below a predetermined temperature in accordance with example embodiments of the present disclosure.
Figure 5B:
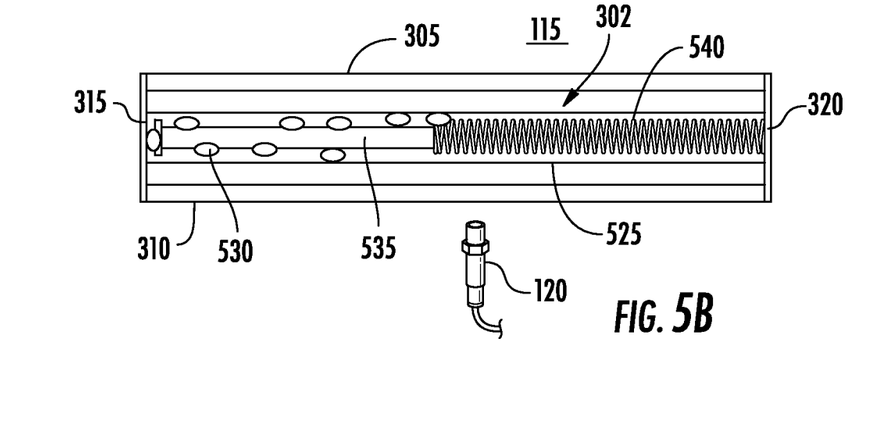
FIG. 5B illustrates a temperature monitor, such as the one discussed in FIG. 5, in an instance the temperature of the conveyor belt is above a predetermined temperature in accordance with example embodiments of the present disclosure.

FIGS. 5A and 5B illustrate the deformation of the temperature sensor in accordance with an example embodiment regardless of belt rotation (e.g., the only difference due to belt rotation is which of the first wall 305 and the second wall 310 that the heat passes through during operation). FIG. 5A illustrates temperature monitor 115 in an instance the predetermined temperature has not been reached. In various embodiments, the temperature deformation mechanism may include a temperature deformation tube 525, a temperature deformation material 530, a plunger 535, and a spring 540. In some embodiments, the temperature deformation mechanism 302 includes a temperature deformation tube 525 defined within the first wall 305 and the second wall 310. In some embodiments, the temperature deformation tube 525 may be made out of a non-magnetic permeable material, such as aluminum, stainless steel, copper, brass, or plastic/polymer-based materials.

In some embodiments, the plunger mechanism may include a plunger 535 and a spring 540. In various embodiments, the spring 540 may be a compression spring. In some embodiments the spring 540 may be made out of a non-magnetic permeable material, such as aluminum. In some embodiments, the spring 540 may be attached at a plunger end of the spring to the plunger 535 and also attached at a wall end of the spring to the second anchor 320. In some embodiments, the plunger 535 may be made out of a magnetic permeable material, such as steel, soft iron, mild iron, or the like. In some embodiments, in an instance the predetermined temperature has not been reached, the temperature deformation material 530 may be configured as a solid block (e.g., as shown in FIG. 5A). In such embodiments, the temperature deformation material 530 may be configured to fill an area between the first anchor 315 and the plunger 535, such that the spring 540 may be compressed and the plunger 535 may be restricted from moving along the temperature deformation tube 525. FIGS. 8A-8B illustrate two example installation positions of a temperature monitor 115 in accordance with the embodiments discussed in FIGS. 5A-5B.

In various embodiments, in an instance the predetermined temperature has not been reached, the plunger 535 may be configured to be located within the sensing area of the magnetic proximity sensor 120 when installed. For example, in an instance the proximity sensor 120 is installed at approximately the middle of the length of the temperature monitor 115, the plunger 535 may be configured to have at least a portion of the plunger located in the middle of the temperature deformation tube 525 in a non-deformed state.

As discussed in reference to the example operations below, the temperature deformation mechanism 302 may be configured such that in an instance in which the predetermined temperature is reached, the temperature deformation material 530 sufficiently melts and the plunger 535 is allowed to move along the temperature deformation tube 525 (e.g., due to the restorative force from the spring 540).

In such an example, the plunger may no longer be recognized by the proximity sensor 120 when in operation (e.g., the plunger is no longer in the sensing area). For example, as shown in FIG. 5B, since the temperature deformation material 530 is no longer solid, the plunger mechanism, due to the restorative force of the spring 540, is configured to move the plunger 535 towards, and ultimately into contact with, the first anchor 315. In various embodiments, in an instance the temperature deformation material 530 melts, the temperature monitor 115 is permanently deformed and may not be reused. In some embodiments, the temperature monitors 115 may be configured to be easily replaced in an instance one is permanently deformed. In some embodiments, the temperature monitors 115 may be used to determine whether a predetermined temperature has ever been reached. For example, if the temperature monitor 115 is permanently deformed, then the conveyor belt 110 has experienced the predetermined temperature.

Figure 6A:
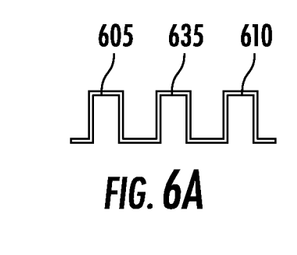
FIG. 6A illustrates example signals recognized by a proximity sensor in an instance the proximity sensor shown in FIG. 5A passes by the proximity sensor in accordance with example embodiments of the present disclosure.

FIG. 6A illustrates the signal recognized by the magnetic proximity sensor 120 relating to the temperature monitor 115 shown in FIG. 5A. As shown, the magnetic proximity sensor 120 may recognize three independent signals (e.g., signals 605, 610, and 635). Signal 605 relates to the first wall 305, signal 610 relates to the second wall 310, and signal 635 relates to the plunger 535. In various embodiments, the magnetic proximity sensor 120 may be positioned such that one or more temperature monitors 115 of example embodiments may pass by the magnetic proximity sensor 120 during the operation of the conveyor belt 110. For example, the magnetic proximity sensor 120 may be positioned such that when the conveyor belt 110 rotates, a temperature monitor 115 may pass by the magnetic proximity sensor 120 registering a signal for each magnetic material within the sensing area of the proximity sensor 120 (e.g., the first wall 305, the second wall 310, and in some instances the plunger 535). As discussed herein, in an instance the predetermined temperature is not reached, the signal includes three consecutive, individual pulses from the first wall 305, the plunger 535, and second wall 310. Alternatively, in an instance the predetermined temperature is reached, the signal includes only two individual pulse as the signal from the plunger 535 is no longer within the sensing area of the proximity sensor 120. In various embodiments, the temperature monitor 115 may operate effectively in either conveyor belt 110 direction. For example, in one direction, the heat from the conveyor belt 110 may be transferred through the first wall 305 (e.g., to the temperature deformation mechanism 302 via the first thermal pathway 390) and in the other direction, the heat from the conveyor belt 110 may be transferred through the second wall 310 (e.g., to the temperature deformation mechanism 302 via the second thermal pathway 395).

Figure 6B:
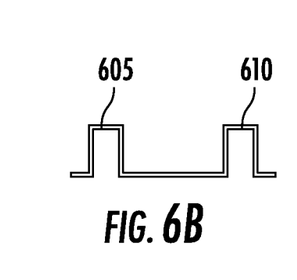
FIG. 6B illustrates example signals recognized by a proximity sensor in an instance the proximity sensor shown in FIG. 5B passes by the proximity sensor in accordance with example embodiments of the present disclosure

As the temperature increases, the temperature deformation material 530 begins to melt, such that solid area breaks apart allowing the plunger 535 to move along the temperature deformation tube 525 (e.g., due to the restorative force from the spring 540) and the plunger is no longer recognized by the proximity sensor 120 when in operation. As shown in FIG. 5B, as the plunger 535 moves towards the first anchor 315, the plunger 535 may no longer be in the sensing area of the magnetic proximity sensor 120 (e.g., the plunger 535 is no longer positioned directly above the proximity sensor 120 when the temperature monitor 115 passes the proximity sensor 120). As such, FIG. 6B illustrates the signals recognized by the magnetic proximity sensor 120 relating to the temperature monitor 115 shown in FIG. 5B. As shown, both of the signals 605, 610 corresponding to the first wall 305 and second wall 310 are still recognized, but the signal 635 corresponding to the plunger 535 is no longer recognized. FIG. 5B illustrates a permanently deformed temperature monitor 115 and as such indicates that at some point in the past the conveyor belt 110 has experienced the predetermined temperature.

In various embodiments, the pulses recognized by the magnetic proximity sensor 120 from the temperature monitor 115 may be stored, such as in an event log or controller, for further processing therein. Additionally, in various embodiments, the pulse width and separation may be a function of conveyor belt velocity, distance between the first wall and the temperature deformation tube 525, the distance between the second wall 310 and the temperature deformation tube 525, and thickness of each of the first wall 305, second wall 310, and plunger 535. As such, the temperature deformation mechanism may designed for a given predetermined temperature melting point of the temperature deformation material 530 needed to register distinctive output pulse (e.g., based on the type of magnetic proximity sensor 120). Additionally or alternatively, the temperature monitor may be designed with a specific size temperature deformation tube 525 needed to register distinctive output pulse.

Various embodiment discussed herein allow for passive temperature monitoring of conveyor belt temperature during operations. Conveyor belts receive heat from various sources, including the items being carried by the conveyor belts. As such, the conveyor belt temperature may drastically increase or decrease during operation. However, conveyor belts often have specific ranges of desired temperatures to ensure proper operation. Example embodiments of the present disclosure allow for monitoring the temperature of the conveyor belt to determine if a predetermined temperature has been reached.

It must be noted that, as used in this specification and the appended claims, the singular forms "a," "an," and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments, but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present disclosure are disclosed herein; however, it is to be understood that the disclosed embodiments are merely exemplary, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While it is apparent that the illustrative embodiments herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A temperature monitor for use on a conveyor belt, the temperature monitor comprising:
a first wall and a second wall, wherein the first wall and the second wall are generally parallel to one another;
a first anchor and a second anchor, wherein the first wall is attached to the first anchor at a first end of the first wall and the first wall is attached to the second anchor at a second end of the first wall, wherein the second wall is attached to the first anchor at a first end of the second wall and the second wall is attached to the second anchor at a second end of the second wall; and
a temperature deformation mechanism defined between the first wall and the second wall, wherein the temperature deformation mechanism comprises a temperature deflection strip configured to deflect towards the first wall or the second wall in an instance in which a predetermined temperature of the conveyor belt is reached.

2. The temperature monitor of claim 1, wherein the temperature monitor is configured to be placed on an exterior of the conveyor belt or within a top cover of the conveyor belt.

3. The temperature monitor of claim 1, wherein the first wall, the second wall, the first anchor, and the second anchor are a unitary housing.

4. The temperature monitor of claim 1, wherein the temperature deflection strip is attached to the first wall at a first end of the temperature deflection strip and the temperature deflection strip is attached to the second wall at a second end of the temperature deflection strip.

5. The temperature monitor of claim 1, wherein the first wall of the temperature monitor is configured to be located perpendicular to the movement of the conveyor belt during operation.

6. The temperature monitor of claim 1, wherein the temperature deformation mechanism further comprises a plunger mechanism and a temperature deformation material, wherein the temperature deformation material is configured to restrict the movement of the plunger mechanism until a predetermined temperature of the conveyor belt is reached.

7. The temperature monitor of claim 6, the plunger mechanism comprises a plunger attached at spring end of the plunger to a spring, wherein the spring is attached to the plunger at a plunger end of the spring and attached to the second anchor at a wall end of the spring.

8. The temperature monitor of claim 7, wherein in an instance the predetermined temperature has not been reached, the temperature deformation material is configured to fill an area between the plunger and the first anchor.

9. The temperature monitor of claim 7, wherein the temperature deformation material is configured to be a solid at below the predetermined temperature and a non-solid at or above the predetermined temperature, wherein in an instance in which the predetermined temperature is reached, the temperature monitor is permanently deformed.

10. A temperature monitor for use on a conveyor belt, the temperature monitor comprising:
- a first wall and a second wall, wherein the first wall and the second wall are generally parallel to one another;
- a first anchor and a second anchor, wherein the first wall is attached to the first anchor at a first end of the first wall and the first wall is attached to the second anchor at a second end of the first wall, wherein the second wall is attached to the first anchor at a first end of the second wall and the second wall is attached to the second anchor at a second end of the second wall; and
- a temperature deformation mechanism defined between the first wall and the second wall, wherein the temperature deformation mechanism comprises a plunger mechanism and a temperature deformation material, wherein the temperature deformation material is configured to restrict the movement of the plunger mechanism until a predetermined temperature of the conveyor belt is reached.

11. The temperature monitor of claim 10, the plunger mechanism comprises a plunger attached at spring end of the plunger to a spring, wherein the spring is attached to the plunger at a plunger end of the spring and attached to the second anchor at a wall end of the spring.

12. The temperature monitor of claim 11, wherein in an instance the predetermined temperature has not been reached, the temperature deformation material is configured to fill an area between the plunger and the first anchor.

13. The temperature monitor of claim 11, wherein the temperature deformation material is configured to be a solid at below the predetermined temperature and a non-solid at or above the predetermined temperature, wherein in an instance in which the predetermined temperature is reached, the temperature monitor is permanently deformed.

14. A temperature monitor for use on a conveyor belt, the temperature monitor comprising:
- a first wall and a second wall, wherein the first wall and the second wall are generally parallel to one another;
- a first anchor and a second anchor, wherein the first wall is attached to the first anchor at a first end of the first wall and the first wall is attached to the second anchor at a second end of the first wall, wherein the second wall is attached to the first anchor at a first end of the second wall and the second wall is attached to the second anchor at a second end of the second wall; and
- a temperature deformation mechanism defined between the first wall and the second wall, wherein the temperature deformation mechanism is altered in an instance in which a predetermined temperature is reached,
wherein the temperature monitor is configured to be placed on an exterior of the conveyor belt or within a top cover of the conveyor belt.

15. The temperature monitor of claim 14, wherein the temperature deformation mechanism comprises a temperature deflection strip configured to deflect towards the first wall or the second wall in an instance in which a predetermined temperature of the conveyor belt is reached.

16. The temperature monitor of claim 15, wherein the temperature deflection strip is attached to the first wall at a first end of the temperature deflection strip and the temperature deflection strip is attached to the second wall at a second end of the temperature deflection strip.

17. The temperature monitor of claim 14, wherein the temperature deformation mechanism comprises a plunger mechanism and a temperature deformation material, wherein the temperature deformation material is configured to restrict the movement of the plunger mechanism until a predetermined temperature of the conveyor belt is reached.

18. The temperature monitor of claim 17, the plunger mechanism comprises a plunger attached at spring end of the plunger to a spring, wherein the spring is attached to the plunger at a plunger end of the spring and attached to the second anchor at a wall end of the spring.

19. The temperature monitor of claim 18, wherein in an instance the predetermined temperature has not been reached, the temperature deformation material is configured to fill an area between the plunger and the first anchor.

20. The temperature monitor of claim 18, wherein the temperature deformation material is configured to be a solid at below the predetermined temperature and a non-solid at or above the predetermined temperature, wherein in an instance in which the predetermined temperature is reached, the temperature monitor is permanently deformed.

* * * * *